INVENTORS
RALPH E. GOULD
GEORGE A. SIMMONS Jr.
BY
ATTORNEYS

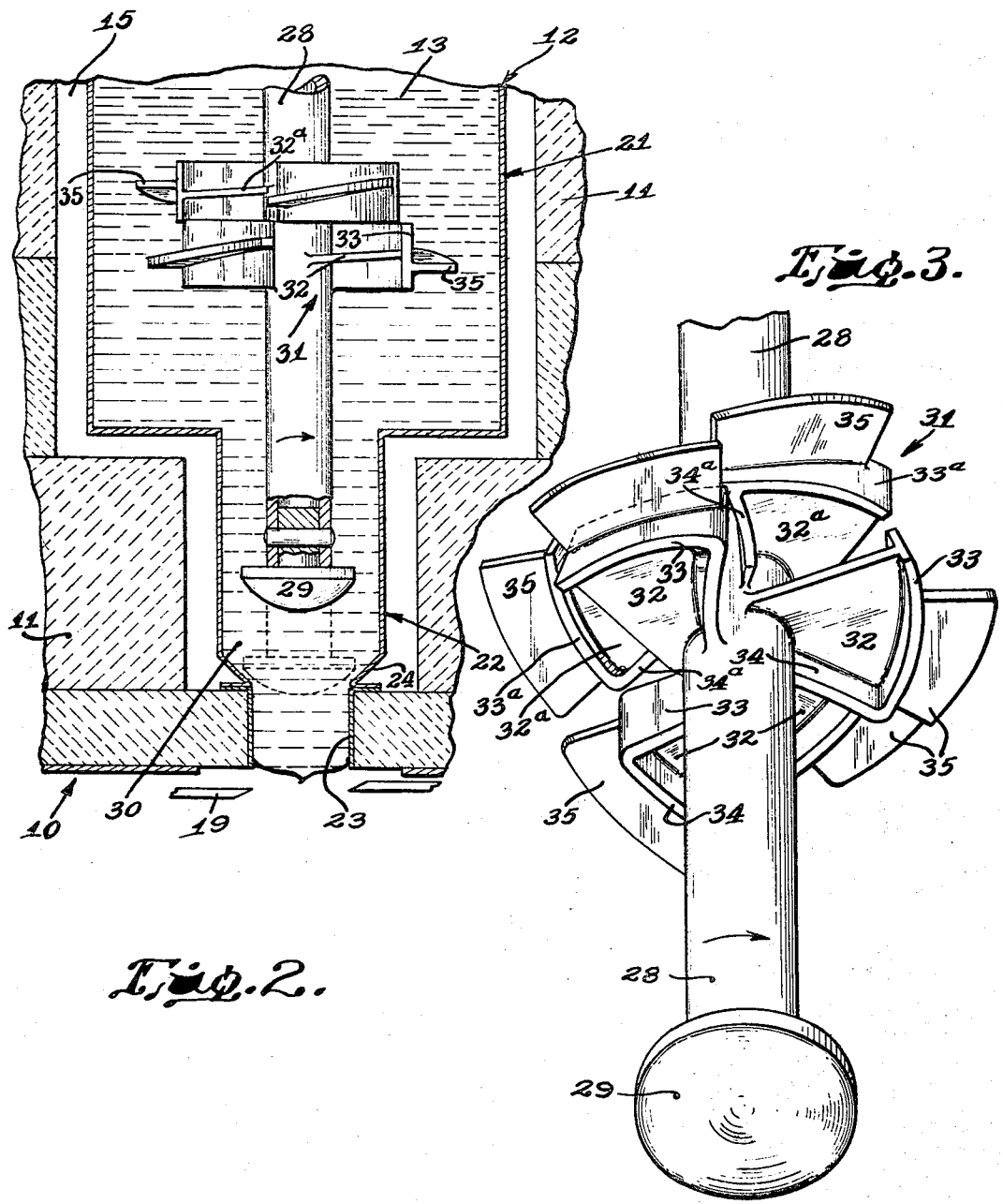

United States Patent Office 3,419,373
Patented Dec. 31, 1968

3,419,373
PUMPING VANE TYPE GLASS FEEDER
Ralph E. Gould and George A. Simmons, Jr., both of Toledo, Ohio, assignors to Owen-Illinois, Inc., a corporation of Ohio
Continuation-in-part of application Ser. 404,230, Oct. 16, 1964. This application Oct. 25, 1967, Ser. No. 691,077
3 Claims. (Cl. 65—180)

ABSTRACT OF THE DISCLOSURE

Mixing and feeding of molten glass in the form of gobs wherein the weight of successively produced gobs is closely controlled. A stirring mechanism composed of a series of circumferentially spaced, arcuate flanges joined to a central, rotating shaft so that glass is drawn toward the center of the mechanism and immediately below the first set of flanges, a second set of arcuate flanges are connected to the shaft in the opposite sense that they cause the glass to move outwardly from the center of the mechanism. This produces an horizontally glass shearing zone therebetween. Down-pumping vanes on the outside of the flanges create an annular, downwardly moving column of glass in surrounding relationship to the shear zone to provide an additional shearing action and create a downward force or pressure within the feeder which is related to the speed of rotation of the stirring mechanism.

Cross-reference to related application

This application is a continuation-in-part of applicants' co-pending application Ser. No. 404,230 filed Oct. 16, 1964, now abandoned.

Summary of the invention

Our invention relates to methods of and apparatus for handling molten glass and more particularly is concerned with working of molten glass in a flow or gravity-type feeder and the provision of means to insure the delivery of mold charges or "gobs" of uniform weight to the molds of a forming machine.

An important object of our invention is the incorporation in a feeder having a bottom outlet, or discharge orifice, of a combined stirrer and pump device positioned a suitable distance above the outlet and functioning to impart homogeneity to the molten glass by a mechanical mixing action and concurrently therewith applying a continuous though regulable downward pressure, supplementing the normal head pressure, to the end that the flow of glass through the orifice and consequent "gob" weight may be closely controlled within heretofore unrealized limits.

It is also an object of our invention to provide a novel method wherein at least a portion of a body or mass of molten glass in a "flow-type" feeder, in addition to being stirred to remove cords, seeds, blisters and other inhomogeneities in the glass, etc., and thereby produce homogeneous glass, is also subjected to a continuous, adjustable, controllable, downward force in the direction of the feeder orifice that is in addition to the static head pressure that is created by the body of glass itself, for the purpose of eliminating commonly experienced variations in "gob" weight in successively produced gobs. In this regard it will be appreciated that "gob" weight variation beyond certain known limits results in the production of substandard glassware, whereas closely maintained "gob" weight, other operating conditions being normal, will result in the production of ware of uniform wall thickness, an exceedingly important factor conducive to satisfactory annealing and strength.

Likewise, it is an object of our invention to provide a novel and highly efficient apparatus wherein a stirrer and pump device comprise an integral part of a feeder needle, such that all three elements both rotate and reciprocate together as a unit and perform the plural function of homogenizing the molten glass above the outlet orifice of a feeder and more closely control the flow rate of glass through the outlet.

Other objects will be in part apparent and in part pointed out hereinafter.

Brief description of the drawings

In the accompanying drawings forming a part of our application:

FIG. 2 is a fragmentary sectional view with parts in elevation showing the glass flow control needle in two operating positions, and FIG. 3 is a fragmentary detail perspective view of the feeder needle and combined stirrer and pump carried thereby.

Figure 1:
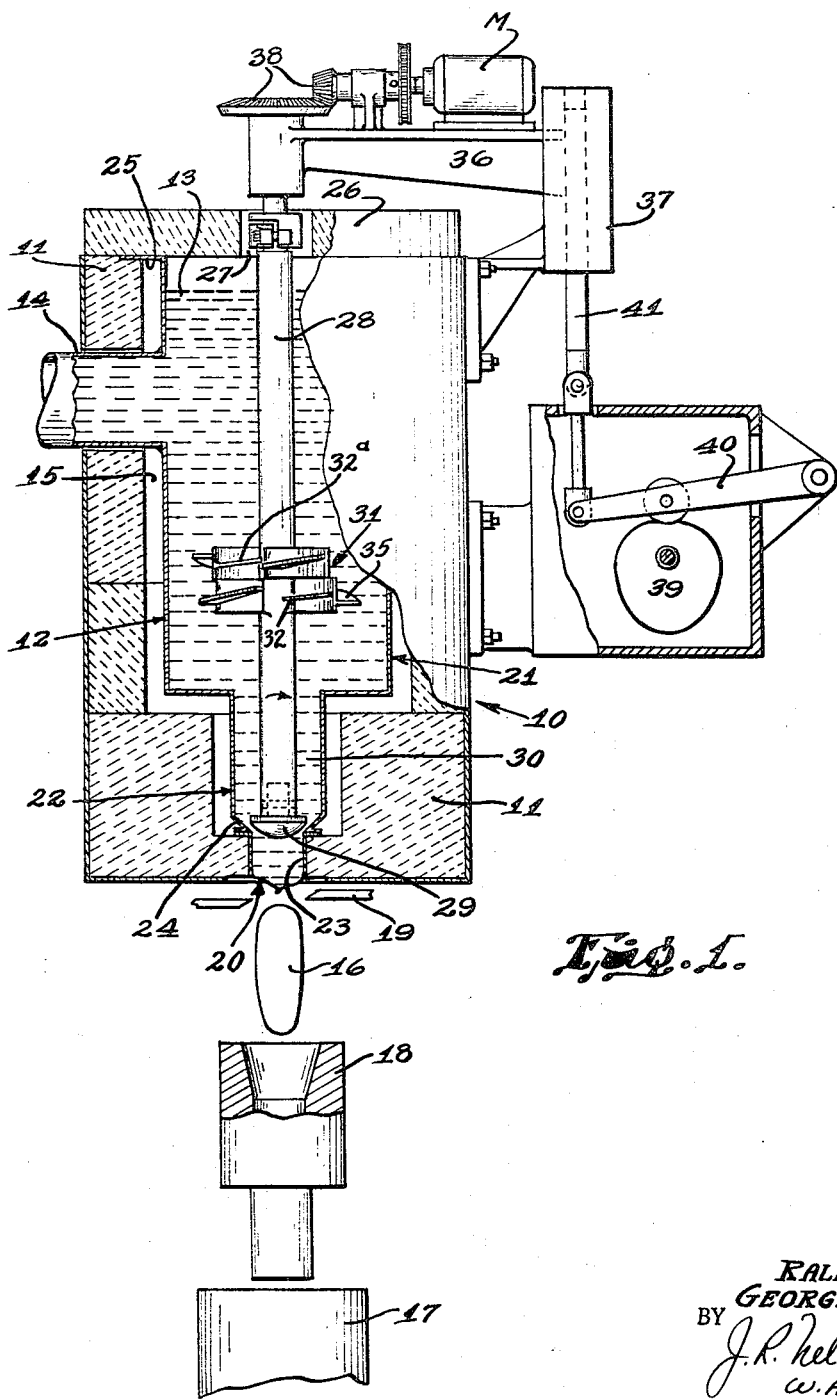
FIG. 1 is a sectional elevational view illustrating an adaptation of our invention.

In the illustrated embodiment of our invention, we utilize a feeder 10 comprising, in its preferred form, a refractory outer shell 11 enclosing an inner cylinder-like receptacle 12 to which molten glass 13 is delivered by way of an inlet 14 from a melter or refiner (not shown). There is a space 15 between the receptacle 12 and shell 11 providing for flow of heat which serves to maintain the glass in said receptacle at the desired temperature and viscosity for delivery in the form of "gobs" 16 or mold charges to a mold 17 by way of a funnel guide 18. In this mold the "gob" of glass may be in part or completely transformed into a finished article. Shears 19 sever the stream of glass extruded in prescribed fashion through the bottom outlet or orifice 20 in a manner which will be explained hereinafter.

The receptacle 12 for the molten glass may be formed of an alloy of platinum, or equivalent material, and comprises a vertical, cylindrical upper portion 21 of relatively large diameter and substantial height and a downward axial extension 22 of reduced diameter. The invention may just as well be performed by constructing the receptacle 12 of a suitable refractory. This extension 22 comprises an outlet orifice creating neck 23, which is joined by an annular, inclined wall 24 to the upper section of the extension 22, thus providing a surface generally comparable in contour with a portion of a feeder needle about to be described. The extreme upper end of the receptacle 12 is formed with a radial supporting flange 25 which is secured between the upper end of the shell 11 and a cover 26 for the latter. A central, vertical opening 27 in the cover 26, coaxial with the outlet orifice forming neck 23, accommodates the upper end portion of a feeder needle 28 which as a unit functions to stir the glass above the outlet orifice to produce homogeneity; to create constant head pressure in the glass beyond that normally created by the mass or head of glass alone; and to apply localized pressure in the orifice outlet to further control the discharge rate of a stream of glass through the latter.

This unit, more specifically, comprises the aforementioned vertical feeder needle 28 carrying at its lower end an inverted head 29 which at all times is reciprocated into the well 30 produced by the aforementioned extension 22. In its lower-most position this head 29 is quite close to the annular inclined wall 24 but never actually physically contacts same. The upper-most position of head 29 may be varied and may even be above the well 30. At a distance above the juncture of the upper and lower sections 21 and 22 of the receptacle 12, but below the level of the inlet 14 for molten glass, is a stirrer and pump device 31, such being mounted upon and subject to both reciprocation and rotation with the needle 28.

The stirrer per se, at least in principle, is similar to that of DeVoe, U.S. Patent No. 2,569,459, issued Oct. 2, 1951, in that it comprises two sets of radial blades, the lower set including an annular series of circumferentially spaced-apart, generally triangular plates 32 peripherally joined to a relatively short arcuate flange 33. The plate is joined to the arcuate flange at about its mid-point axially of the needle 28 and along its leading edge is joined to the medial point of a radial flange 34 which is a continuation of the arcuate flange 33. In operation, the needle rotates in the direction of the arrow thereon. The blades 32 and integral flanges 33 and 34 function during rotation to thoroughly mix the glass, breaking up cords, etc., and effectively serve to produce homogeneous glass. The upper set of blades 32$^a$ (FIG. 3) insofar as the flanges 33$^a$ and 34$^a$ are concerned, are the reverse of the lower set. As can be readily seen, the upper set of flanges are oriented so that upon rotation of the needle 28 glass will be drawn inwardly toward the axis of the needle. The second set of arcuate flanges 33, positioned immediately below the first set, are oriented such that they will force glass outwardly. Thus a substantially horizontal zone of shearing action will take place between the two sets of flanges.

To the end that additional and controllable head pressure may be applied to the glass, especially in the area or zone just above the well 30, and maintained substantially constant, irrespective of the height of the column of glass in the receptacle, and provided, however, that the level is above the stirrer unit, we equip the stirrer with external radial pumping vanes 35 or impeller blades which function to supplement the stirring action of the blades 32 and 32$^a$, but more importantly to produce and maintain an above-normal static head pressure, so completely free from deviation from a predetermined desirable pressure that close gob-weight control is readily obtainable. The vanes 35 on both sets of flanges 33 create a downwardly moving, annular column of glass in surrounding relationship with respect to the sets of flanges. Thus additional shearing of the glass will result where the outwardly moving glass in the horizontal shear zone encounters the downwardly moving column of glass.

Superior mixing is thus provided without the necessity of the stirrer mechanism being in close proximity to the side walls of the chamber 12. Prior art devices of the type disclosed in the DeVoe patent, supra, require that the clearance be no greater than ⅜″. We have successfully operated our device with clearances as great as 1 full inch with superior control over "gob" weight. In fact, our method and apparatus, when employed in delivering 6.4 ounce gobs of molten glass, actually produced such weight within a range of plus or minus 0.015 ounce.

Each vane 35 is angularly positioned so that it moves glass downwardly into the well 30, incident to counter-clockwise rotation of the needle 28, as viewed from above. Also, these blades may well have their adjacent ends slightly overlapping (FIG. 3) thereby to more effectively break up cords in the glass and contribute to complete stirring. The speed of rotation of the stirrer and pumping unit is, of course, determined by the viscosity of the glass and considering what "gob" weight is desired.

We have found that with other conditions being maintained constant, such as needle reciprocation frequency and amplitude, viscosity and temperature, changes in rotational speed are directly reflected in "gob" weight variations. Thus, closer control over "gob" weight with superior mixing is accomplished by our invention.

Although other mechanism than that illustrated may be utilized to rotate and reciprocate the needle, stirrer and pump unit, we have shown same as being similar to that of Peiler, U.S. Patent No. 1,852,218, issued Apr. 5, 1932, such comprising a motor M supported upon a base 36 which is carried by a vertical slide 37. The motor M rotates the needle 28 through a drive including meshing bevel gears 38, one of which is secured to the upper end of the feeder needle 28. Thus, the stirrer and pump means are both rotated, as explained previously. Reciprocation of the needle, stirrer, and pump axially in timed relation to the arrival of molds 17 at the charging position is obtained by a rotating cam 39 of proper contour, such cam oscillating a lever 40 which in turn reciprocates the slide rod 41 and aforementioned slide 37 to thereby raise and lower the latter and with it the motor M and needle, etc. The cam contour is such that in operation the needle is lowered relatively rapidly in each feeding cycle to quickly extrude the desired amount of glass and at the proper time retracts rather slowly so that the shears 19 may easily sever the gob or mold charge from the parent body. The downward movement of the needle within the well 30, of course, exerts pressure supplementing the head pressure created by the rotating vanes 35 and, as a consequence, with rotation of the latter at a constant speed as determined by the glass viscosity, we obtain excellent control over "gob" weight, as explained previously. Obviously, reciprocation of the needle 28 must be timed with arrival of the mold 17 in the charging position beneath the orifice and such may be obtained through the use of any of the many timers disclosed in the glass art. As a specific example, when producing the 6.4 oz. gobs, the speed of rotation of the stirrer was 40 r.p.m. and the viscosity of the glass was jog 3.25.

Modifications may be resorted to within the spirit and scope of the appended claims.

We claim:

1. In a molten glass feeder, a receptacle having a bottom outlet orifice, means for supplying molten glass to the receptacle, a vertical needle in the receptacle coaxial with the orifice, a head carried by the needle at its lower end, said head being of larger diameter than that of the outlet orifice, glass stirring means carried by the needle comprising an annular series of radial plates lying in planes substantially normal to the needle axis, an arcuate flange at the outermost margin of and circumferentially coextensive with such margin of each said plate, a radial flange interconnecting one end of each radial flange and the needle, with both said flanges disposed substantially at a right angle to the radial plates, radially extending pumping vanes extending outwardly from and carried by the arcuate fingers for creating an annular column of downwardly moving glass supplementing the head pressure of glass existing by reason of the head of glass over the outlet orifice, and means for both vertically reciprocating and rotating the vanes, stirring means and needle.

2. In a feeder as defined in claim 1, each vane having a leading edge and a trailing edge with the leading edge of one vane overlapping the trailing edge of the preceding vane.

3. In a feeder as defined in claim 1, the stirring means comprising an annular series of radial blades, arcuate peripheral flanges at the outermost edges of and individual to each of the blades, and said pumping vanes extending radially outwardly from the flanges and being elongated and identically inclined in a circumferential direction about the axis of the needle.

(References on following page)

References Cited

UNITED STATES PATENTS

| | | | |
|---|---|---|---|
| 2,569,459 | 10/1951 | DeVoe | 65—178 XR |
| 2,570,078 | 10/1951 | Spemulli | 65—180 |
| 2,570,079 | 10/1951 | Spemulli | 65—180 |
| 2,831,664 | 4/1958 | Spemulli | 65—178 XR |
| 2,871,000 | 1/1959 | Dowling | 65—178 XR |
| 2,891,777 | 6/1959 | Gregorius | 65—178 XR |
| 3,174,729 | 3/1965 | Cala | 65—180 XR |

DONALL H. SYLVESTER, *Primary Examiner.*

FRANK W. MIGA, *Assistant Examiner.*

U.S. Cl. X.R.

65—129, 128, 330, 331, 326